(12) United States Patent  
Ferrari

(10) Patent No.: US 7,331,093 B2  
(45) Date of Patent: Feb. 19, 2008

(54) PIECES HOLD-UNIT FOR WORKSTATIONS, TRANSFER MACHINES AND LIKE

(75) Inventor: Rosario Ferrari, Travagliato (IT)

(73) Assignee: DM2 di DUINA Gianfranco S.r.l., Brescia (IT)

( * ) Notice: Subject to any disclaimer, the term of this patent is extended or adjusted under 35 U.S.C. 154(b) by 65 days.

(21) Appl. No.: 11/014,531

(22) Filed: Dec. 16, 2004

(65) Prior Publication Data

US 2005/0223530 A1    Oct. 13, 2005

(51) Int. Cl.  
*B23P 23/00* (2006.01)  
*B25B 1/18* (2006.01)

(52) U.S. Cl. .................. 29/38 B; 269/32; 269/43; 269/225

(58) Field of Classification Search ............ 29/38 A, 29/38 B; 269/27, 32, 43, 309, 311, 221, 269/222, 225  
See application file for complete search history.

(56) References Cited

U.S. PATENT DOCUMENTS

| | | | | |
|---|---|---|---|---|
| 500,364 A | * | 6/1893 | Baker | 269/55 |
| 3,488,046 A | * | 1/1970 | Quick et al. | 269/20 |
| 4,246,813 A | * | 1/1981 | Grachev et al. | 82/127 |
| 4,484,775 A | * | 11/1984 | Norkus | 294/88 |
| 4,785,525 A | * | 11/1988 | Ishida et al. | 483/18 |
| 4,793,469 A | * | 12/1988 | Foster | 198/750.5 |
| 5,201,501 A | * | 4/1993 | Fassler | 269/32 |
| 5,261,148 A | * | 11/1993 | Ettori | 29/38 B |
| 5,374,040 A | * | 12/1994 | Lin | 269/43 |
| 5,833,223 A | * | 11/1998 | Furuuchi | 269/93 |
| 6,185,802 B1 | * | 2/2001 | Gruber et al. | 29/38 R |
| 6,185,818 B1 | * | 2/2001 | Ito et al. | 29/889.7 |
| 6,273,408 B1 | * | 8/2001 | Moilanen et al. | 269/32 |
| 6,340,154 B1 | * | 1/2002 | Young | 269/246 |
| 6,502,809 B1 | * | 1/2003 | Gionta | 269/43 |
| 6,629,345 B2 | * | 10/2003 | Albeck et al. | 29/38 R |

* cited by examiner

*Primary Examiner*—Monica Carter  
*Assistant Examiner*—Eric A. Gates  
(74) *Attorney, Agent, or Firm*—McGlew and Tuttle, P.C.

(57) ABSTRACT

A pieces hold-unit for machine tools such as workstations, transfer machines and milling machines is provided which comprises two parallel supports (12, 13) placed on a plane with at least a first of said support guided, controlled and movable with respect to the other one in order to approach and move them away, at least a first clamp-holder shaft (14) rotary mounted on the said first support and controlled for rotating, a second clamp-holder shaft (15) mounted on the other of said supports. Each shaft holds a clamp opposite to that of the other shaft, and one gear-reduction unit (16) is located at least on board of the support carrying said first shaft to follow the movements of said support and cause the gradual rotation of said first shaft.

18 Claims, 6 Drawing Sheets

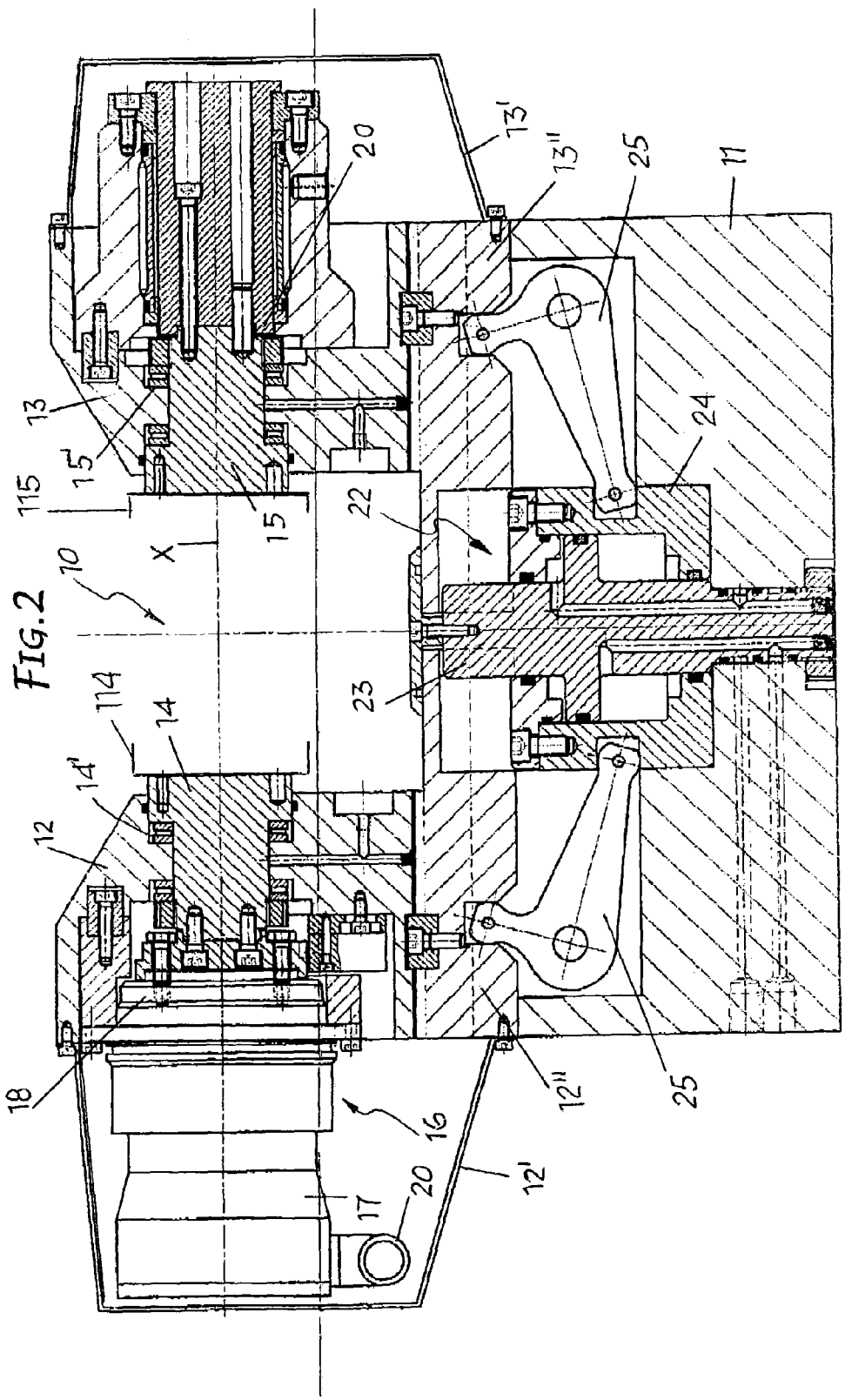

PIECES HOLD-UNIT FOR WORKSTATIONS, TRANSFER MACHINES AND LIKE

FIELD OF THE INVENTION

The present invention concerns in general the field of machine tools for multiple mechanical machining such as workstations, transfer machines, milling machines and the like, and it refers in particular to pieces hold-units, that is to say vice, to be used in such machines.

STATE OF THE TECHNIQUE

Machine tools for automatic multiple machining usually comprise several operating units variously associated with a machine-member which holds the pieces to be processed.

In workstations, for instance, the pieces-holder member can be in the shape of a prismatic body fitted out, on one or more faces, with several clamps designed for receiving and keeping the pieces to be processed. The prismatic body can be provided to rotate on an axis so that the pieces kept by the clamps may be exposed towards the operating units. In such a use the clamps are mostly not revolving, so the effective orientation of the pieces with respect to the tools turns out to be limited. As a matter of fact the clamps are usually movable only in their opening and closing position, mostly with a manual blocking/unblocking, that is a condition that generally requires the presence of at least an operator in order to load and unload the pieces in the clamps onto at least an additional pieces-holder body outside the machine, while the pieces previously loaded onto another pieces-holder body are being machined.

In transfer machines the pieces that have to be machined are loaded and kept in clamps or vices put on a rotary worktable with several operating units associated. The worktable is rotated on a vertical or horizontal axis in order to bring every piece along a sequence of workstations, where the operating units are placed.

In this use the clamps can be rotated. In this case they are controlled by a power unit that generally is far from the rotation axis of the clamp and that consequently requires a transmission gearing, belt or Cardan joint drive in order to be able to actuate the piece rotation with some disadvantages because of the overall dimensions, the wear and tear of drive components, the loss of precision in the piece rotation caused by the processing tolerance and by the unavoidable coupling clearance and by what else technicians of this field know very well.

The pieces hold-units can be in the shape of independent clamps or vices that apart from their installation manner can be fixed or revolving. However, also in this case the clamps or vices, if rotating, suffer from the same disadvantages above mentioned, because they are usually provided with a power unit which is placed under the clamp or vice and which requires an additional transmission system for the pieces-holder clamps drive.

OBJECTS AND SUMMARY OF THE INVENTION

The present invention is aimed to get out of limitations and disadvantages of the known technique through a pieces hold-unit provided with a pair of clamps that are supported in revolving way and controlled as for their rotation by a power unit placed directly on board thereof.

Consequently and advantageously, it is possible to eliminate the usual mechanical transmissions, to reduce the overall dimensions of the system and to facilitate hold-units installation and utilization onto any pieces-holder member or worktables typical of workstations, transfer machines and the like.

Therefore, another object of the invention is to provide a pieces hold-unit for the fitting out of both flat and prismatic pieces-holder member or body, with the hold-units being automatically controllable for blocking/unblocking a piece and revolving to orientate the pieces with respect to the working tools.

So, thanks to this system it will be possible to eliminate or at least to reduce the presence of an operator, by automatically loading/unloading the pieces into the clamps or vices on one or more faces of the prismatic member, for instance through a manipulator, even while executing machining on pieces in clamps on other faces of the same member.

Another object of the invention is to provide a hold-unit with revolving clamps suitable to the fitting out of rotary worktables of transfer machines in effective and simple way, being able to make use of components, if available, which such worktables are already provided with.

A further object of the invention is to provide a pieces hold-unit in the shape of a revolving vice, that integrates the means of control arranged to make it compact, rigid and less subject to wear and tear, therefore designed to ensure and keep unaltered its work precision in time, and also interfaceable with control systems of the machines which it is applied to.

According to the invention such objects are achieved through a pieces hold-unit which comprises two parallel supports placed on a plane with at least a first of said support guided, controlled and movable with respect to the other one in order to approach and move them away, a first clamp-holder shaft rotary mounted on the said first support and controlled for rotating, a second clamp-holder shaft mounted on the other of said supports, every shaft holding a hold-clamp opposite to that of the other shaft, and at least one gear-reduction unit on board of at least of said first support carrying said rotary shaft to follow the movements of said support and cause the gradual rotation of said first shaft.

Moreover it will be possible to guide and move both supports in opposite directions and both the hold-unit shafts could be controlled, each one by a respective gear reducing unit.

BRIEF DESCRIPTION OF THE DRAWINGS

The invention will be, however, described more in detail hereinafter, referring to the enclosed drawings, in which:

FIG. 2 is a median longitudinal section of the vice in FIG. 1.;

DETAILED DESCRIPTION OF THE INVENTION

Figure 1:
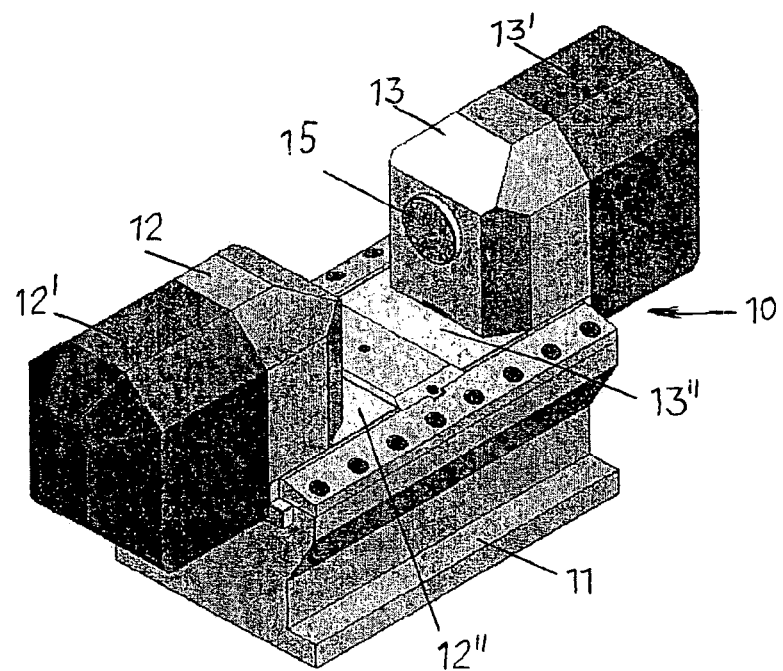
FIG. 1 is a schematic representation from the outside of a vice with fixed body.

In the embodiment according to FIGS. 1 and 2, the pieces hold-unit 10 comprises two parallel supports 12, 13 guided on a base body 11 and at least one of them movable in the direction of the other one in order to be able to bring them nearer and move them away as required. A first controlled clamp-holder shaft 14 is rotary mounted on a support 12, while a second clamp-holder shaft 15 is rotary mounted, but in idle state, on the other support 13. The two shafts 14, 15 are on a common axis X, and each one is arranged to be frontally fitted out with a hold-clamp 114, 115 for the piece to be machined. The clamps are usually shaped according to the piece to process and are associated with said shafts in interchangeable way. Both the controlled shaft 14 and the idle shaft 15 are mounted and centred on the respective supports 12, 13 through thrust bearings 14',15' or bushings.

The controlled shaft 14 is moved by a gear-reduction unit 16, for instance by a precision epicycloidal type unit, to cause a gradual rotation of the shaft itself. The gear-reduction unit 16, that can be electric or hydraulic, is mounted on an outer side of the support 12 in order to follow the movements thereof. It preferably comprises a brushless motor 17 and a reducer 18, that can be on the same axis or positioned at right angles one with respect to the other, but with outlet of said reducer on the same axis and connected to the controlled shaft 14. The motor is also associated with an encoder, a resolver or another device in order to detect its angular position and to be able to manage the shaft gradual rotation and through it, the rotation of the piece to machine round geometrical axis of the shaft itself.

The idle shaft 15 on the other support 13 is preferably associated with a braking contrivance 20 to block the revolving system in the angular position from time to time required during the piece processing.

The reduction unit 16 on one side and the hydraulic brake 20 on the other side will be included in a protective housing 12', 13'.

As structural variation, also the second shaft 15 can be moved by a gear reduction unit so that it is possible to have a pieces hold unit whose two clamps 114, 115 can rotate positively, also independently. In this case, the reduction unit for the second shaft 15 will be in the place or in addition to the braking contrivance 20.

When both supports 12, 13 are movable, they are fixed on respective basic slides 12", 13" guided in the base body 11. Then, said supports can be actuated by an hydraulic actuator 22 placed in the base body, without projecting out of this latter. Such an actuator may comprise a fixed piston 23, blocked in the base body, and a cylinder or liner 24 that can be moved in axial way with respect to the piston and that is connected through two balancing levers 25, directed in opposite directions, to said slides 12", 13" as shown in FIG. 2. Thus, feeding properly the actuator 22 with a hydraulic fluid, the movement of the cylinder is produced one way or the other, and consequently causes, through the balancing levers 25, the approaching and removing movements of the supports 12, 13 on taking or releasing a piece by means of the clamps 114, 115 on the clamps-holder shafts 14, 15.

Figure 3:
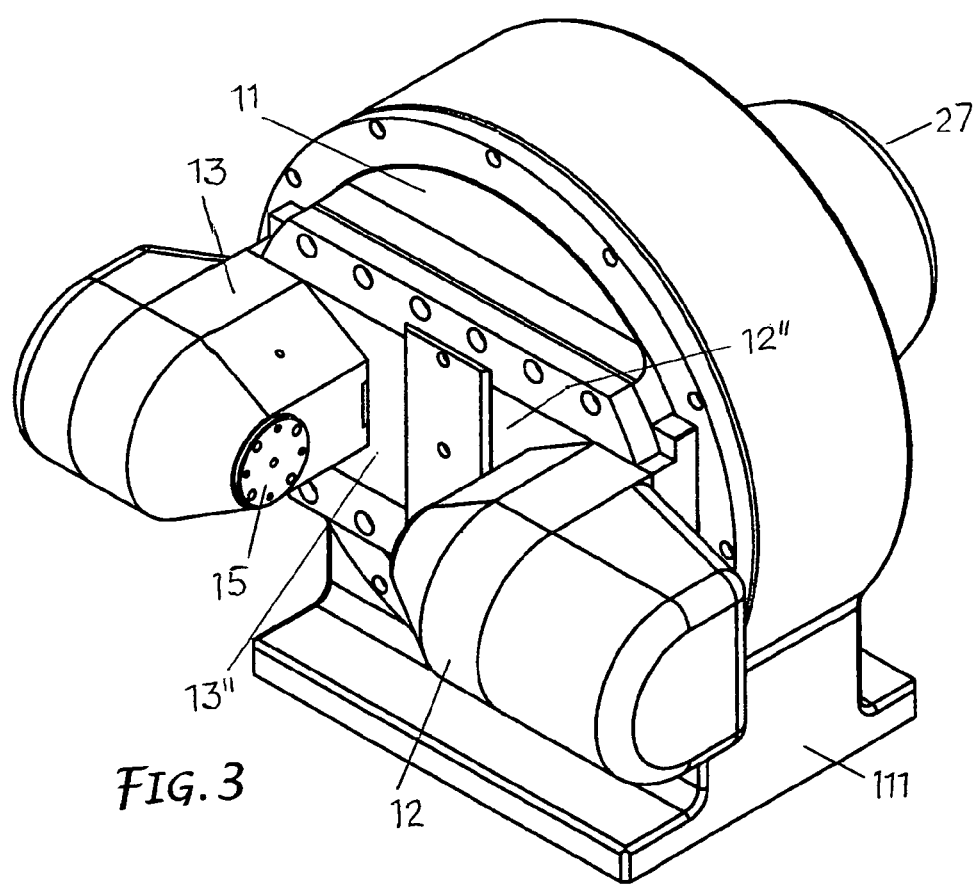
FIG. 3 is a schematic representation of a vice with a revolving body.
Figure 4:
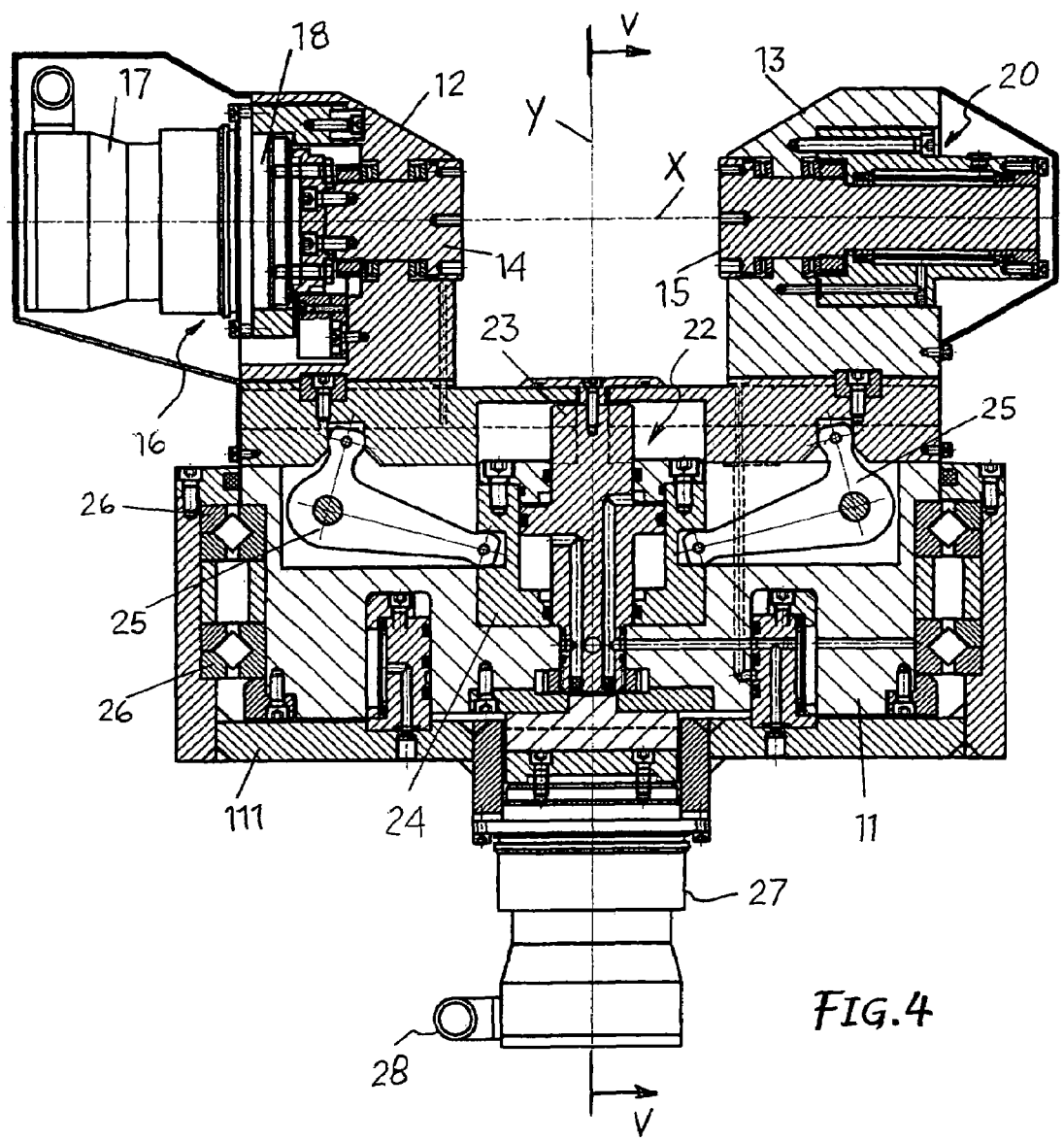
FIG. 4 is a section view on a horizontal plane of the vice in FIG. 3.
Figure 5:
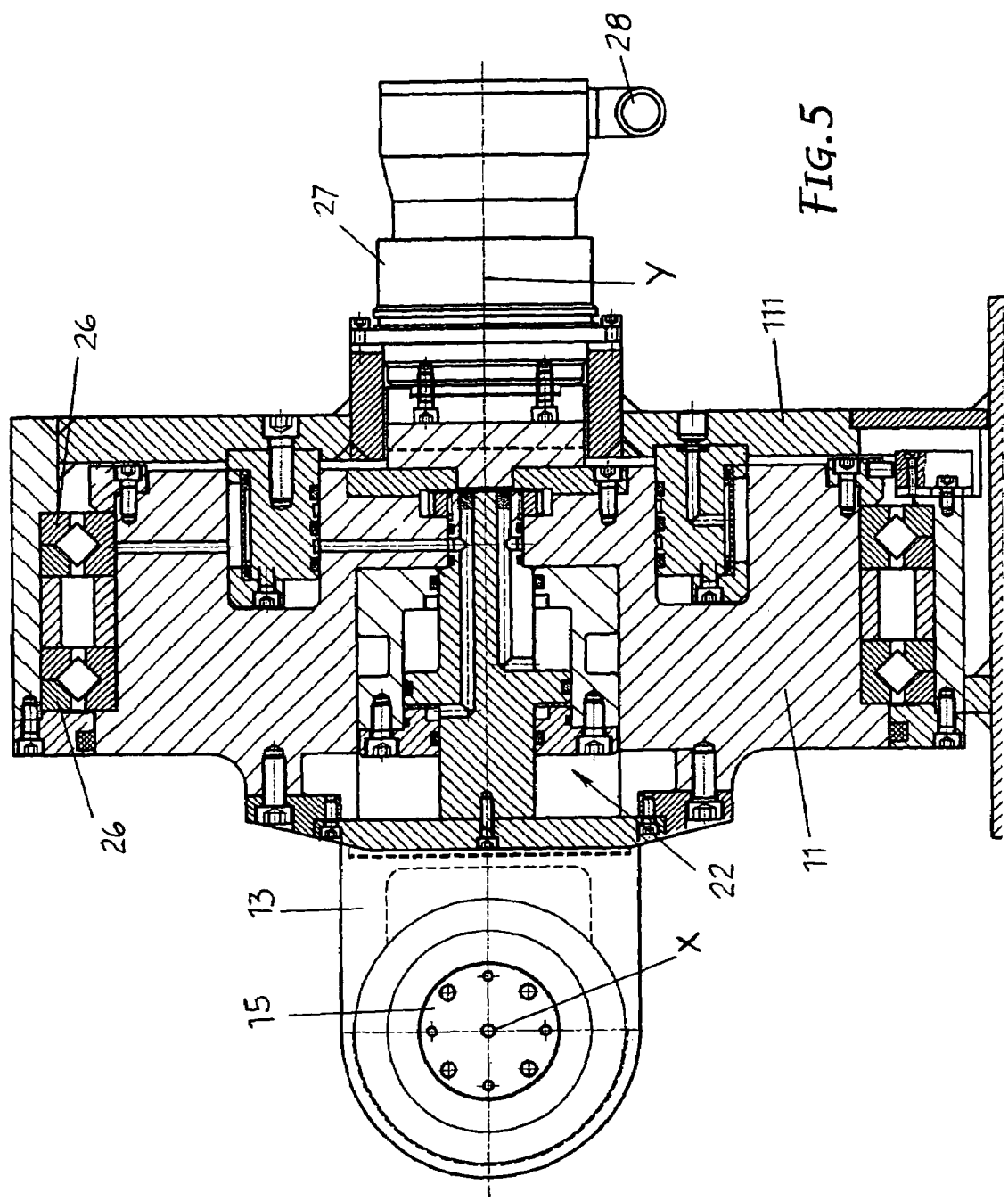
FIG. 5 is a vertical section view according to the arrows V-V in FIG. 4.

In the example shown in FIGS. 3-5, wherein the elements that are equal or corresponding to the ones of the vice described in FIGS. 1 and 2, are indicated with the same reference numbers, the vice body 11 that carries the movable supports 12 and 13 with the clamps-holder shafts 14, 15 on board, instead of being fixed, is mounted on a base 111 with the interposition of bearings 26 and is susceptible of rotations or oscillations on an axis Y orthogonal to axis X of the above mentioned clamps-holder shafts. As regards its rotation/oscillation the vice body 11 is moved by a respective gear-reduction unit 27, that is mounted on the base body 11 and that can be of the kind that controls a clamps-holder shaft rotation and is managed in the same way through an encoder 28 or another device that detects its angular position.

The hold-unit 10 above described can find several appliances. For instance, when it is used in the preparation of rotary worktables for transfer machines and the like, the base body 11 can be omitted and the supports 12, 13 can be directly associated on the carriages which a table is already provided with in order to apply to it traditional type clamps.

However, in any appliances the work-holder member has to be equipped with several pieces hold-units 10 but is not provided in itself with equipment where to fix the supports 12, 13 for their approaching and removing movements. This is the case, for instance, of a flat body 121 (FIG. 6) or a prismatic body 122 (FIG. 7) that have to be equipped with several hold-units 11 in order to bring several pieces to be processed at a workstation or something like that. In this case such supports 12, 13 can be associated, through the basic slides 12", 13", with the flat body 121 or the prismatic body 122, connected and movable through a control actuator 22-25 that is placed or integrated in such body as well. Also this control system can comprise, as shown in FIG. 8 and as represented in FIG. 2, a hydraulic actuator 22 that has a fixed piston 23 and a cylinder or liner 24 movable in axial way as to the piston and connected, through two balancing levers 25 directed in opposite directions, to the basic slides 12", 13".

Figure 7:
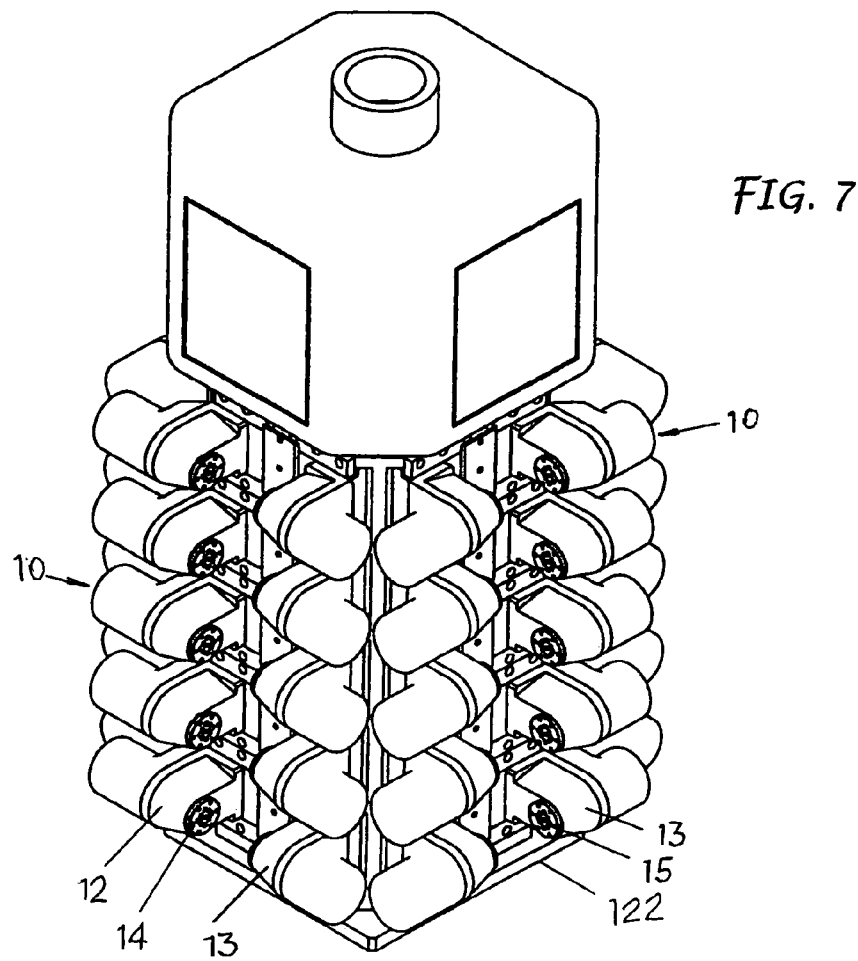
FIG. 7 is a prismatic support fitted out with hold-units according to the invention.
Figure 6:
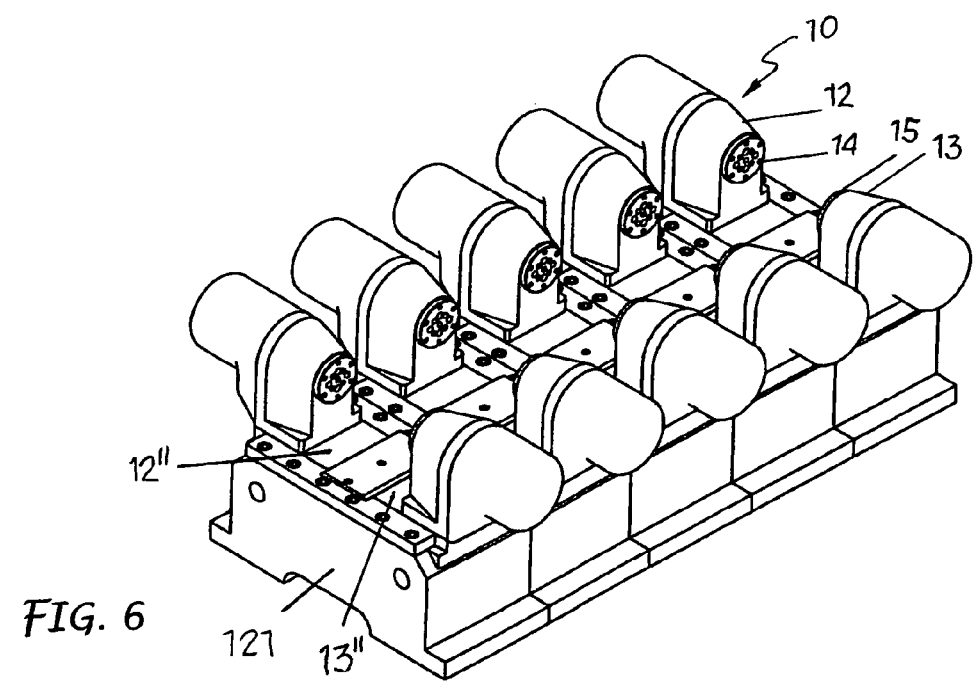
FIG. 6 is a work plane fitted out with several hold-units according to the invention.
Figure 8:
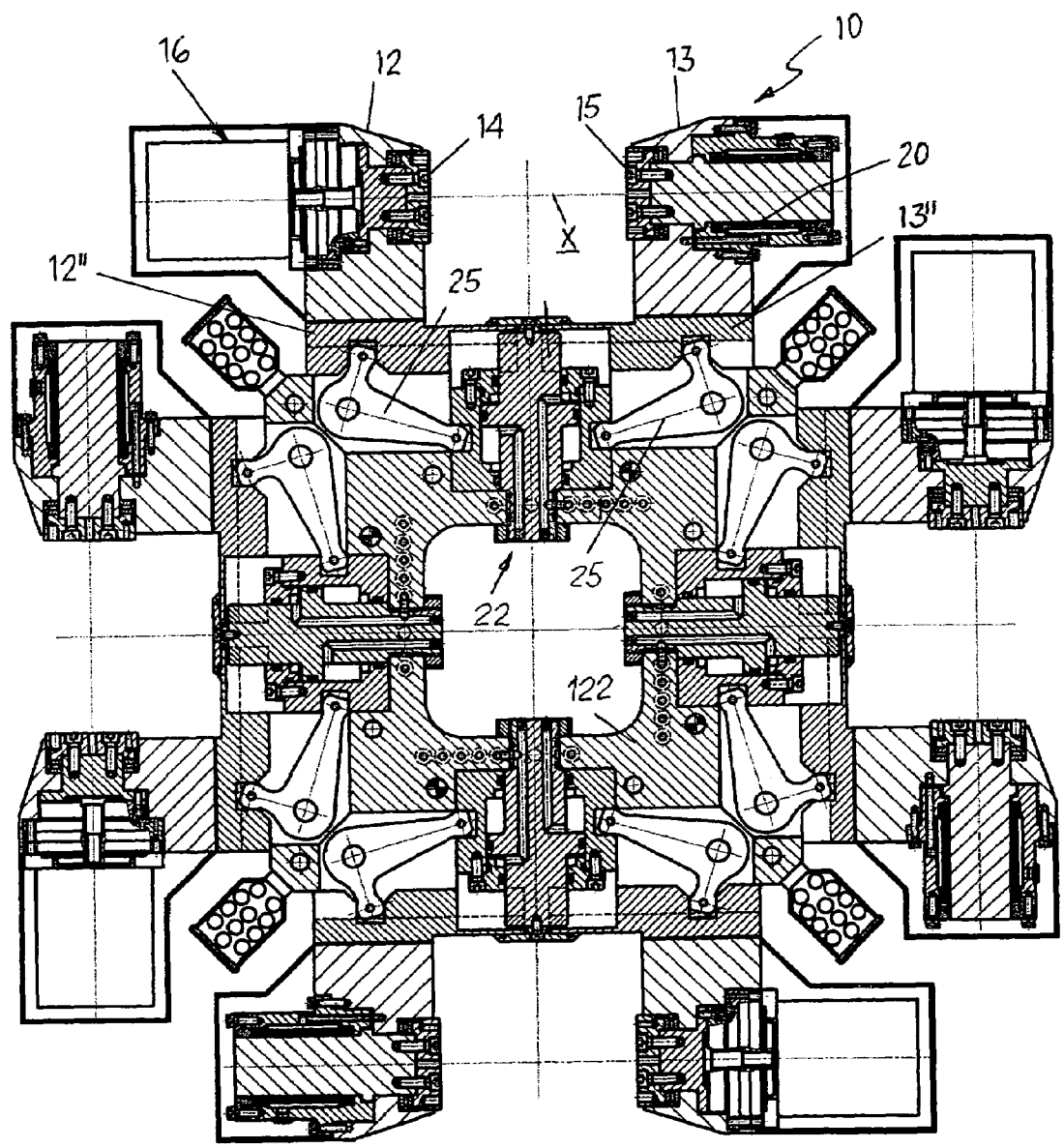
FIG. 8 is a cross section view of the prismatic support in FIG. 7.

In each appliance, both individual and plural with other hold-units in the ambit of a rotary worktable for transfer machines or of work-holder members with one or more faces as shown in FIGS. 6 and 7, the pieces hold-unit of the invention can enjoy the advantages of having a power unit on board that is movable with at least one of the clamp-holder supports and a minimum overall dimensions, having neither transmission drives nor voluminous appendages. Furthermore, the adoption of hold-units according to the invention allows the fitting out of both plain and prismatic work-holder supports as in FIGS. 6 and 7, where it will be possible to enjoy the advantages of an automatic clamps opening/closing, whereas it is generally manual, and of a piece rotation with respect to the tools, whereas it is generally missing.

The invention claimed is:

1. A pieces hold-unit comprising: a first support and a second support forming two parallel supports placed on a plane with at least said first support guided, controlled and movable with respect to said second support in order to approach and move said supports away from each other; a first clamp-holder shaft rotary mounted on said first support and controlled for rotating; and a second clamp-holder shaft mounted on said second support, said first shaft holding a hold-clamp opposite to a holding clamp held by said second shaft; and a gear-reduction unit including a first shaft drive supported by and movable with said first support carrying said first shaft to follow the movements of said first support and to cause a gradual rotation of said first shaft relative to said first support, wherein the gear-reduction unit comprises a motor connected and managed through a precision reducer, whose outlet is coaxial and flanged to the respective controlled clamp-holder shaft.

2. A pieces hold-unit according to claim 1, wherein the first and the second shafts are coaxial, and wherein the second shaft is idle and provided with a braking and blocking device.

3. A pieces hold-unit according to claim 1, wherein both the parallel supports are guided, controlled and movable in opposite directions, wherein said clamp-holder shafts are mounted in a revolving manner, each one on a respective support, and actuated to rotate, and wherein a gear-reduction unit is mounted on board of each of the said supports in order to follow their movements and to control the rotation of said shafts also independently one from the other.

4. A pieces hold-unit according to claim 3, wherein said supports are fixed on basic slides controlled as for parallel approaching and removing movements of said supports.

5. A pieces hold-unit according to claim 4, wherein said basic slides with said supports are mounted and movable on a fixed base body.

6. A pieces hold-unit according to claim 4, wherein said basic slides with said supports are mounted and movable on a base body, which is susceptible to rotations or oscillations on at least one axis orthogonal to the axis of said shafts.

7. A pieces hold-unit according to claim 4, wherein said basic slides with said supports are mounted and guided on a fixed work-holder member of a machine tool and are movable in opposite directions.

8. A pieces hold-unit according to claim 4, wherein said basic slides with said supports are mounted and guided on a rotary work-holder member of a machine tool and are movable in opposite directions.

9. A pieces hold-unit according to claim 4, wherein said basic slides are connected to a hydraulic actuator for their parallel movements.

10. A pieces hold-unit according to claim 9, wherein said hydraulic actuator comprises a piston in fixed position, a cylinder movable in axial way with respect to the piston, and a pair of balancing levers directed in opposite directions and connecting said cylinder to the basic slides.

11. A pieces hold-unit according to claim 1, wherein the motor is also connected and managed through a device that detects the angular position, and said motor and reducer are arranged in line or positioned at right angles one towards the other.

12. A pieces hold-unit according to claim 1, wherein the pieces hold unit is provided on a side of a work-holder member in prismatic shape for machine tools, workstations and the like.

13. A pieces hold-unit according to claim 1, wherein two or more of pieces hold unit are lined up on a surface of a work-holder surface for machine tools, workstations and the like.

14. A rotary worktable for transfer machines, comprising: a plurality of pieces hold-units, wherein said plurality of pieces hold units are provided on the base rotary worktable with a surface plane, each pieces hold unit including: a first parallel support provided on said surface plane and including an opening parallel to said plane; a second parallel support provided on said surface plane and including another opening parallel to said plane and opposite said opening to define a space between said opening and said another opening, wherein said first parallel support is guided, controlled and moved with respect to said second parallel support to narrow and widen said space; a first clamp holder shaft displaceably mounted in said first parallel support and rotating out of said opening about said axis; a second clamp holder shaft mounted in said second parallel support; and a drive means for rotating said first shaft relative to said first parallel support, said drive means comprising a motor connected and managed through a precision reducer, whose outlet is coaxial and flanged to the first clamp holder shaft, said drive means being fixed to and movable with said first parallel support and movable relative to each of the base rotary worktable and said second parallel support, wherein each support of every pieces hold-unit is applied on basic slides, consisting of carriages placed on said worktable and intended to hold usual clamps.

15. A piece holding unit comprising: a base body with a surface plane; a first parallel support provided on said surface plane and including an opening parallel to said plane; a second parallel support provided on said surface plane and including another opening parallel to said plane and opposite said opening to define a space between said opening and said another opening, wherein said first parallel support is guided, controlled and moved with respect to said second parallel support to narrow and widen said space; a first clamp holder shaft displaceably mounted in said first parallel support and rotating out of said opening about said axis; a second clamp holder shaft mounted in said second parallel support; and a drive means for rotating said first shaft relative to said first parallel support, said drive means comprising a motor connected and managed through a precision reducer, whose outlet is coaxial and flanged to the first clamp holder shaft, said drive means being fixed to and movable with said first parallel support and movable relative to each of said base body and said second parallel support.

16. A piece holding unit according to claim 15, further comprising:
an actuating means for positioning, locking and holding said first parallel support in relation to said second parallel support.

17. A piece holding unit according to claim 16, wherein said actuating means includes basic slides for moving one of said supports on said surface plane, said basic slides being connected to a hydraulic actuator for support movement.

18. A piece holding unit according to claim 15, wherein the piece holding unit is provided on a surface of a work-holder member in prismatic shape or a work-holder surface.

* * * * *